United States Patent Office
2,888,470
Patented May 26, 1959

2,888,470
CYCLOPENTANOPHENANTHRENE DERIVATIVES AND PROCESS

Howard J. Ringold, Franz Sondheimer, and George Rosenkranz, Mexico City, Mexico, assignors to Syntex S.A., Mexico City, Mexico, a corporation of Mexico No Drawing. Application August 13, 1954
Serial No. 449,766

Claims priority, application Mexico August 18, 1953

4 Claims. (Cl. 260—397.4)

The present invention relates to a novel process for the production of cyclopentanophenanthrene compounds and to certain novel cyclopentanophenanthrene compounds and intermediates.

More particularly, the present invention relates to a novel method for the production of esters of the androgenic hormone testosterone and dihydrotestosterone, a novel method for the production of the cortical hormone 17-hydroxy progesterone and to a novel method for the production of a new cortical hormone $\Delta^{4,16}$-pregnadien-3,20-dione-21-ol and its esters.

In our United States Patent application Serial No. 401,058, filed December 29, 1953, now Patent No. 2,802,839, there is disclosed a novel process for the production of steroidal 3-ketones from the corresponding steroidal 3-formates involving the treatment of the 3-formates with an aluminum alkoxide in the presence of a hydrogen acceptor.

In accordance with the present invention it has been discovered that this oxidation treatment of 3-formates producing corresponding steroidal 3-ketones forms in combination with certain other steps a novel process for the production of esters of testosterone from the known starting material dehydroepiandrosterone ($\Delta^5$-androstene-3$\beta$-ol-17-one), as well as for the production of dihydrotestosterone and/or its esters from the known starting material androsten-3$\beta$-ol-17-one. It has further been discovered in accordance with the present invention that sodium borohydride in solution in an organic solvent, preferably an organic ether solvent, is capable of reducing keto groups to hydroxyl groups even in the presence of other esterified groups, and that in particular it is not capable of even saponifying the formate group which is, as herein set forth, sensitive to the action of aluminum alkoxides.

There has further been discovered in accordance with the present invention a novel process for the production of the important cortical hormone 17-hydroxy progesterone which involves the formation of the 3-formate of $\Delta^5$-pregnene-3$\beta$,17$\alpha$-diol-20-one followed by the production of the 3-formate-17-acylate and finally, the selective oxidation of the 3-formate by means of an aluminum alkoxide in the presence of a hydrogen acceptor.

There has further been discovered in accordance with the present invention a novel cortical hormone $\Delta^{4,16}$-pregnadien-3,20-dione-21-ol and its esters as well as the preparation of this novel hormone by treatment of the 3-formate-21-acylate of $\Delta^{5,16}$-pregnadiene-3$\beta$,21-diol-20-one with an aluminum alkoxide in the presence of a hydrogen acceptor.

A portion of the process of the present invention is exemplified by the following equation:

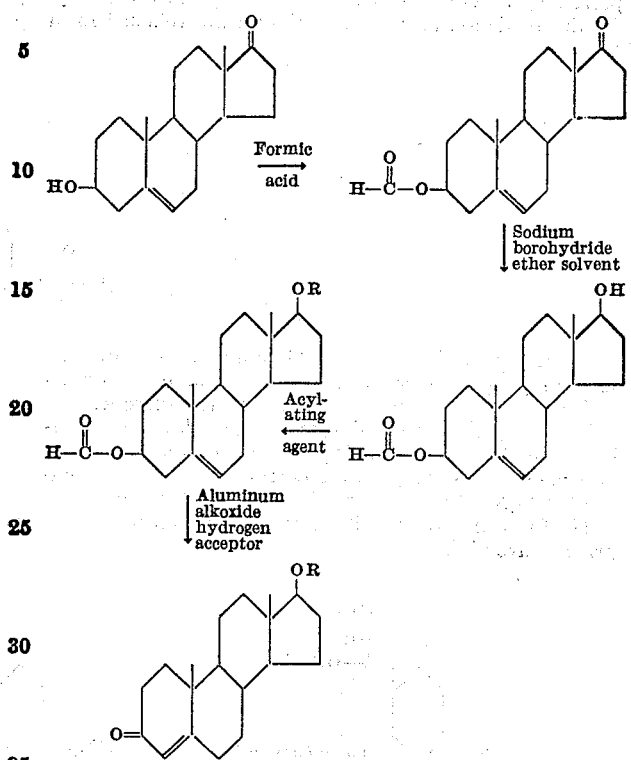

In the above equation R represents the esterification residue of an acid customarily used for the esterification of steroid alcohols; preferably R represents the esterification residue of a lower fatty acid or an aromatic acid such as benzoic acid. The character of R, of course, depends on the particular acylating agent utilized for the third step of the above set-forth reaction.

In general, in practicing the reaction above set-forth dehydroisoandrosterone is dissolved in formic acid and the solution kept for a period of time of the order of one hour at an elevated temperature, as for example 60° C. The reaction solution is then cooled and poured into water to precipitate the formate of dehydroisoandrosterone, which is suitably purified as by crystallization solvents such as mixtures of acetone-hexane. For the second step of the above equation the formate of dehydroisoandrosterone is dissolved in an organic ether solvent. This organic ether solvent may be anhydrous or it may contain a small percentage of $H_2O$, as for example of the order of one percent and such solvents are referred to hereinafter as "substantially anhydrous." Suitable solvents for this purpose are for example tetrahydrofurane or dioxan. The sodium borohydride is preferably dissolved in the solvent prior to the addition of the formate. The reaction mixture of solvent, sodium borohydride and formate is then stirred for a substantial period of time, as of the order of three hours, at room temperature and then formic acid is added to destroy the excess of sodium borohydride. Upon concentration, precipitation with water and purification the corresponding 3-formate of Δ⁵-androstene-3β,17β-diol is obtained. The 3-formate of Δ⁵-androstene-3β,17β-diol is then treated with an acylating agent as for example acetic anhydride or propionic anhydride in the presence of p-toluenesulphonic acid preferably under mild conditions for a relatively long period of time. There is thus produced the corresponding 3-formate-17-acylate of Δ⁵-androstene-3β,17β-diol. This compound is then dissolved in an inert solvent such as xylene or toluene and then treated with the usual type of aluminum alkoxides customarily used for Oppenauer steroid oxidations, as for example, aluminum isopropylate in the presence of a hydrogen acceptor, preferably a ketone such as cyclohexanone. Preferably, for this oxidation reaction the mixture was refluxed for a short period of time such as 45 minutes. The organic solvents are then removed and the precipitate when purified was the corresponding ester of testosterone.

In exactly similar reaction to that just described starting with the corresponding saturated compound androstan-3β-ol-17-one gave the corresponding ester of androstan-17β-ol-3-one (ester of dihydrostestosterone).

The following equation illustrates another portion of the present invention:

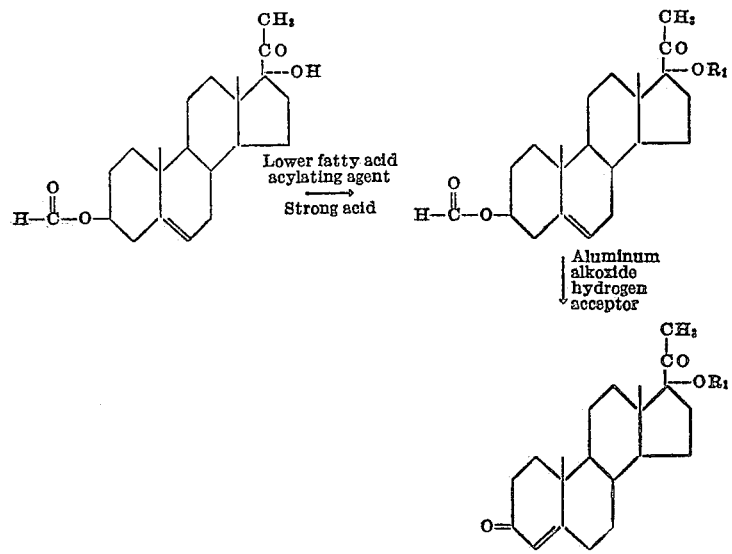

In the above equation R₁ represents the residue of a lower fatty acid produced in accordance with the above equation by the action of the lower fatty acid acylating agent.

In practicing the process above outlined the 3-formate of Δ⁵-pregnene-3β,17α-diol-20-one prepared in accordance with our United States patent application Serial No. 401,058, is treated with a lower fatty acid anhydride in the presence of a strong acid such as a halogen acid or strong organic acid as for example p-toluene sulfonic acid. The mixture is preferably agitated for a relatively long period as for example 9 hours at room temperature. There is thus produced the 3-formate-17-acetate of Δ⁵-pregnene-3β,17α-diol-20-one. This 3-formate-17-acetate is then dissolved in an inert organic solvent such as xylene containing cyclohexanone and aluminum isopropylate is then added thereto. As may be understood, other inert solvents and ketone hydrogen acceptors as well as other aluminum alkoxides may be utilized. The resultant compound is the 17-lower fatty acid acylate of the cortical hormone Δ⁴-pregnene-17α-ol-3,20-dione. This compound can then be saponified as for example with dilute methanolic potassium hydroxide to give the corresponding 17-alcohol Δ⁴-pregnene-17α-ol-3,20-dione (17-hydroxy progesterone).

The following equation illustrates still another portion of the present invention:

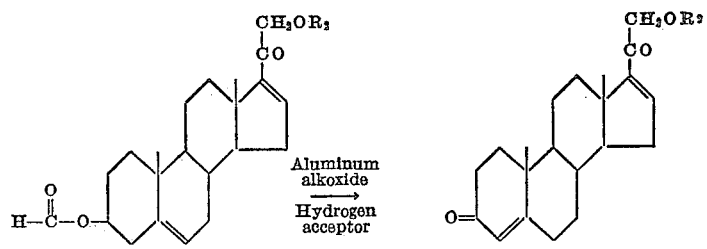

In the above equation R₂ represents the residue of a suitable acid customarily used for the esterification of steroid hormones, preferably a lower fatty acid such as acetic or propionic or the residue of an aromatic acid such as benzoic. In accordance with the above equation a mixed ester such as the 3-formate-21-acetate of Δ⁵,¹⁶-pregnadiene-3β-21-diol-20-one, prepared in accordance with United States application Serial No. 435,084, filed June 7, 1954, now Patent No. 2,791,593, is treated with an aluminum alkoxide in the presence of a hydrogen acceptor in an inert solvent in accordance with the oxidation steps previously described. The resultant compound is a new cortical hormone 16-dehydro-desoxycorticosterone.

The following specific examples serve to illustrate but are not intended to limit the present invention:

*Example I*

5 g. of dehydroisoandrosterone was dissolved in 55 cc. of formic acid and the solution was kept for one hour at a temperature of 60° C. It was cooled, poured into water and the precipitate was filtered, washed to neutral and dried. There was obtained 4.8 g. of the formate of dehydroisoandrosterone, which after crystallization from acetone-hexane gave the analytical sample with melting point 141–145° C. [α]$_D$ −8° (chloroform).

4 g. of the formate was dissolved in 150 cc. of distilled tetrahydrofurane and mixed with 1.5 cc. of water and 0.2 g. of sodium borohydride. The mixture was stirred for 3 hours at room temperature and then formic acid was added to destroy the excess of hydride. The solution was concentrated, precipitated with water and the precipitate was filtered, washed and dried. 2.9 g. was obtained of the 3-formate of Δ$^5$-androstene-3β,17β-diol.

0.5 g. of the 3-formate of Δ$^5$-androstene-3β,17β-diol was oxidized by the method described in detail in Example II, and after crystallization of the product from acetone-hexane, there was obtained 270 mg. of Δ$^4$-androstene-3,17-dione with melting point 167–170° C.

*Example II*

1 g. of the 3-formate of Δ$^5$-androstene-3β,17β-diol and 0.34 g. of p-toluenesulphonic acid was dissolved in 10 cc. of acetic anhydride and the mixture was kept for 16 hours at room temperature. The 3-formate 17-acetate crystallized directly from the reaction mixture and was filtered, washed with water and dried. There was obtained 530 mg. with melting point 144–148° C.; precipitation with water of the mother liquors afforded an additional 530 mg. with lower melting point and with a purity of approximately 50%.

0.5 g. of the 3-formate 17-acetate of Δ$^5$-androstene-3β,17β-diol was dissolved in 15 cc. of xylene, mixed with 5 cc. of cyclohexanone and 3 cc. of the solution was distilled in order to remove traces of moisture. 0.5 g. of aluminum isopropylate was then added and the mixture was refluxed for 45 minutes, cooled and diluted with water; the organic solvents were removed by steam distillation, the residue was cooled and the precipitate was filtered and dried. Recrystallization from acetone-hexane yielded 250 mg. of the acetate of testosterone with melting point 137–140° C.

*Example III*

Following the method described in Example II, except that propionic anhydride was used instead of acetic anhydride, there was obtained the 3-formate 17-propionate of Δ$^5$-androstene-3β,17β-diol, with melting point 106–109° C. in 80% yield; [α]$_D$ −65° (chloroform). Starting from this compound, the propionate of testosterone was obtained in 63% yield, with melting point 118–121° C.

*Example IV*

5 g. of the 3-formate of Δ$^5$-pregnene-3β,17α-diol-20-one prepared in accordance with out United States application Serial No. 401,058, suspended in 120 cc. of acetic anhydride was treated with 1.5 g. of p-toluenesulphonic acid and the mixture was stirred for 9 hours at room temperature. It was poured into water and after 2 hours standing, the precipitate was filtered and washed to neutral, thus yielding the 3-formate 17-acetate of Δ$^5$-pregnene-3β,17α-diol-20-one in a yield of over 90%.

1 g. of this 3-formate 17-acetate was dissolved in 30 cc. of xylene and 10 cc. of cyclohexanone and 4 cc. of the solution were distilled in order to remove traces of moisture. 1 g. of aluminum isopropylate was added to the hot solution and the mixture was refluxed for 45 minutes. After cooling to 90° C., water was added and the organic solvents were removed by steam distillation. Salt was added to the aqueous suspension and the residue was filtered, dried and extracted with hot acetone. The acetone solution was evaporated to dryness and the residue was crystallized from chloroform-methanol, thus giving 610 mg. of the 17-acetate of Δ$^4$-pregnen-17α-ol-3,20-dione (17-acetoxy-progesterone) with melting point 239–240° C. Saponification of this compound with 1% methanolic potassium hydroxide yielded 80% of Δ$^4$-pregnen-17α-ol-3,20-dione.

*Example V*

7 g. of the 3-formate 21-acetate of Δ$^{5,16}$-pregnadiene-3β,21-diol-20-one dissolved in 300 cc. of xylene and 120 cc. of cyclohexanone was mixed with 6 g. of aluminum isopropylate previously dissolved in 30 cc. of xylene. After refluxing for 2 hours, the solution was washed with dilute hydrochloric acid and water, the organic solvents were removed by steam distillation, the residue was extracted with ether and the ether solution was dried and evaporated to dryness. The residue, weighing 6 g., was chromatographed in a column with 250 g. of activated alumina. The crystalline fractions eluted from the column with benzene were combined and recrystallized from acetone-hexane, thus affording 4.3 g. of the acetate of 16-dehydro-desoxycorticosterone with melting point 145–148° C. The analytical sample had melting point 152–154° C, [α]$_D$ +150° (chloroform), ultraviolet absorption maximum: λ max. 240 mμ (log E 4.44).

*Example VI*

7 g. of the 3-formate 21-acetate of Δ$^{5,16}$-pregnadiene-3β,21-diol-20-one dissolved in 350 cc. of toluene and 120 cc. of cyclohexanone was subjected to the treatment in accordance with the method described in Example V. The acetate of 16-dehydro-desoxycorticosterone was obtained with the same yield and with the same characteristics as reported in Example V.

*Example VII*

10 g. of androstan-3β-ol-17-one was suspended in 250 cc. of 85% formic acid and the mixture was stirred for 2 hours at a temperature of 65° C. The cooled solution was poured into water, the precipitate was filtered, washed to neutral and dried. Recrystallization from acetone-hexane yielded 8.9 g. of the formate of androstan-3β-ol-17-one.

8 g. of the formate was dissolved in 300 cc. of distilled tetrahydrofurane and mixed with 3 cc. of water and 0.4 g. of sodium borohydride. The mixture was stirred for 3 hours at room temperature and then formic acid was added to destroy the excess of hydride. The solution was concentrated, precipitated with water and the precipitate was filtered, washed and dried. 5.8 g. was obtained of the 3-formate of androstane-3β,17β-diol.

5 g. of the 3-monoformate dissolved in 50 cc. of acetic anhydride was mixed with 1.5 g. of p-toluenesulphonic acid and kept overnight at room temperature. The 3-formate 17-acetate of androstane-3β,17β-diol crystallized directly from the reaction mixture. Filtration and purification by routine methods afforded 3.8 g. of the compound.

0.5 g. of the 3-formate 17-acetate of androstane-3β,17β-diol was dissolved in 15 cc. of xylene and 5 cc. of cyclohexanone and 3 cc. of the solution was distilled in order to remove traces of moisture. 0.5 g. of aluminum isopropylate was added and the mixture was refluxed for 45 minutes and cooled. The organic solvents were removed by steam distillation and the residue was extracted with chloroform, washed and evaporated to dryness. Recrystallization from acetone-hexane yielded 295 mg. of the 17-acetate of androstan-17β-ol-3-one (acetate of dihydrotestosterone) with melting point 156–158° C.

We claim:

1. A method for the production of a lower fatty acid ester of Δ$^4$-pregnene-17α-ol-3,20-dione which comprises treating the 3-formate of Δ$^5$-pregnene-3β,17α-diol-20-one with a lower fatty acid acylating agent in the presence of a strong acid to form the corresponding 3-formate 17-lower fatty acid acylate and treating the last mentioned compound with an aluminum alkoxide in the presence of a ketone hydrogen acceptor to form the lower fatty acid of Δ⁴-pregnene-17α-ol-3,20-dione.

2. The method of claim 1 wherein the aluminum alkoxide is aluminum isopropylate and the hydrogen acceptor is cyclohexanone.

3. A 3-formate 17-lower fatty acylate of Δ⁵-pregnene-3β,17α-diol-20-one.

4. The 3-formate 17-acetate of Δ⁵-pregnene-3β,17α-diol-20-one.

References Cited in the file of this patent

UNITED STATES PATENTS 2,745,852    Ehrhart _____ May 15, 1956

FOREIGN PATENTS 211,651    Switzerland _____ Jan. 16, 1941
536,621    Great Britain _____ May 21, 1941